US010363838B2

(12) United States Patent
Runde et al.

(10) Patent No.: US 10,363,838 B2
(45) Date of Patent: Jul. 30, 2019

(54) QUICK ADJUST POWER ADJUSTER

(71) Applicant: Magna Seating Inc, Aurora (CA)

(72) Inventors: David M. Runde, Beverly Hills, MI (US); Jason R Davis, Commerce Township, MI (US)

(73) Assignee: Magna Seating Inc., Aurora, Ontario ( * ) Notice: Subject to any disclaimer, the term of this patent is extended or adjusted under 35 U.S.C. 154(b) by 29 days.

(21) Appl. No.: 15/512,132

(22) PCT Filed: Sep. 21, 2015

(86) PCT No.: PCT/US2015/051238
§ 371 (c)(1),
(2) Date: Mar. 17, 2017

(87) PCT Pub. No.: WO2016/044841
PCT Pub. Date: Mar. 24, 2016

(65) Prior Publication Data
US 2017/0253145 A1    Sep. 7, 2017

Related U.S. Application Data

(60) Provisional application No. 62/103,719, filed on Jan. 15, 2015, provisional application No. 62/052,638, filed on Sep. 19, 2014.

(51) Int. Cl.
*B60N 2/06* (2006.01)
*B60N 2/07* (2006.01)
(Continued)

(52) U.S. Cl.
CPC ......... *B60N 2/0715* (2013.01); *B60N 2/0155* (2013.01); *B60N 2/067* (2013.01);
(Continued)

(58) Field of Classification Search
USPC ...... 248/424, 429; 297/311, 312; 296/65.01, 296/65.11, 65.12, 65.13
See application file for complete search history.

(56) References Cited

U.S. PATENT DOCUMENTS 4,949,585 A * 8/1990 Dauvegne ............ B60N 2/0224
                                                    254/102
5,150,872 A * 9/1992 Isomura ............... B60N 2/0232
                                                    248/429

(Continued)

FOREIGN PATENT DOCUMENTS

| CN | 103213519 | 7/2013 |
|---|---|---|
| GB | 2074442 | 11/1981 |
| JP | 6226139 | 2/1987 |

*Primary Examiner* — Alfred J Wujciak
(74) *Attorney, Agent, or Firm* — Miller Canfield

(57) ABSTRACT

A power adjuster (30) for adjusting the position of an upper track (16) relative to a lower track (18) of a seat track assembly (10). The power adjuster includes a lead screw (22) fixedly secured to the upper track, a drive assembly (32) operatively coupled to the upper track and selectively coupled to the lead screw, a driven assembly (34) operatively coupled to the lead screw and selectively coupled to the drive assembly, and a release mechanism (36) coupled to the upper track. The release mechanism is operable between a locked condition coupling the driven assembly to the drive assembly and the upper track wherein the driven assembly and the drive assembly move longitudinally along the lead screw with the upper track relative to the lower track and an unlocked condition wherein the driven assembly is decoupled from the upper track and retained along the lead screw during movement of the upper track relative to the lower track.

10 Claims, 11 Drawing Sheets

(51) Int. Cl.
*B60N 2/08* (2006.01)
*B60N 2/015* (2006.01)
*B60N 2/02* (2006.01)

(52) U.S. Cl.
CPC .............. *B60N 2/0875* (2013.01); *B60N 2/06* (2013.01); *B60N 2/07* (2013.01); *B60N 2/08* (2013.01); *B60N 2002/024* (2013.01); *B60N 2002/0236* (2013.01)

(56) References Cited

U.S. PATENT DOCUMENTS

| | | | | |
|---|---|---|---|---|
| 5,267,717 | A * | 12/1993 | Isomura | B60N 2/067 248/419 |
| 5,516,071 | A | 5/1996 | Miyauchi | |
| 6,464,421 | B1 * | 10/2002 | Kiefer | B60N 2/929 403/21 |
| 8,061,756 | B2 * | 11/2011 | Kimata | B60N 2/067 248/429 |
| 9,511,685 | B2 * | 12/2016 | Enokijima | B60N 2/067 |
| 2006/0237619 | A1 * | 10/2006 | Nakamura | B60N 2/0232 248/429 |
| 2010/0243852 | A1 | 9/2010 | Muraishi | |
| 2015/0298581 | A1 * | 10/2015 | Nagata | B60N 2/067 248/429 |
| 2016/0059739 | A1 * | 3/2016 | Tsuji | B60N 2/0705 248/429 |
| 2016/0059740 | A1 * | 3/2016 | Shimizu | B60N 2/06 248/429 |
| 2018/0029504 | A1 * | 2/2018 | Nagata | B60N 2/067 |

\* cited by examiner

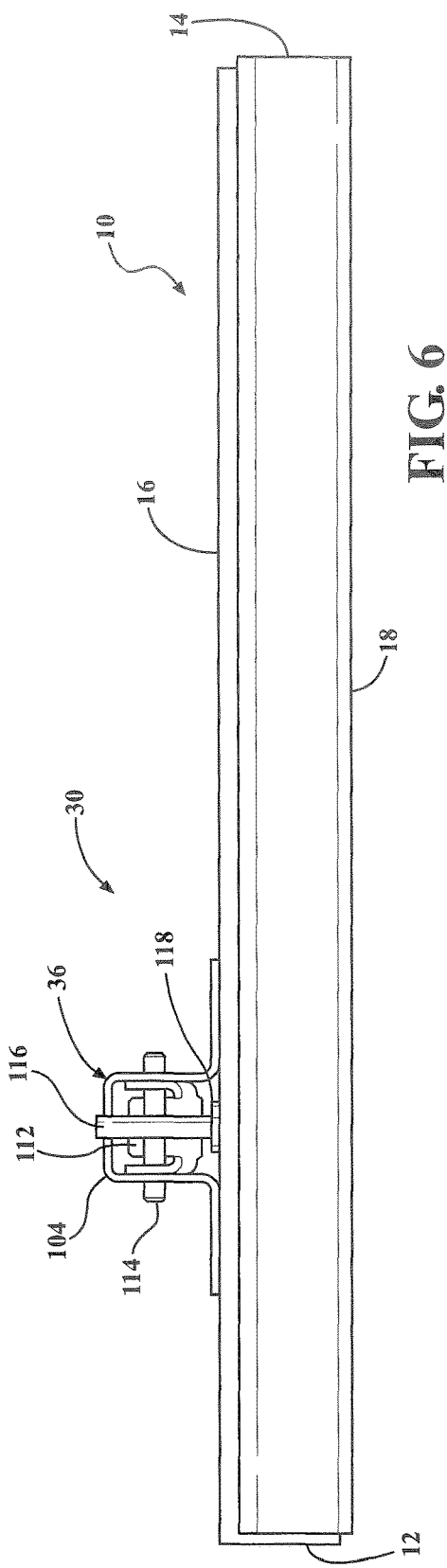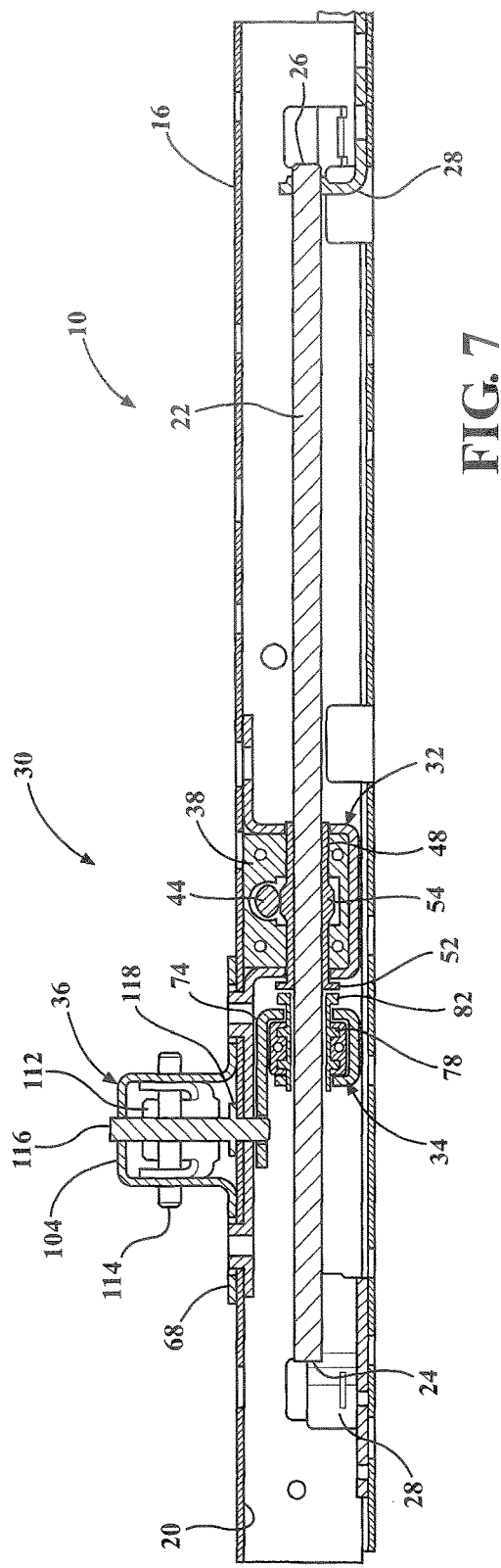

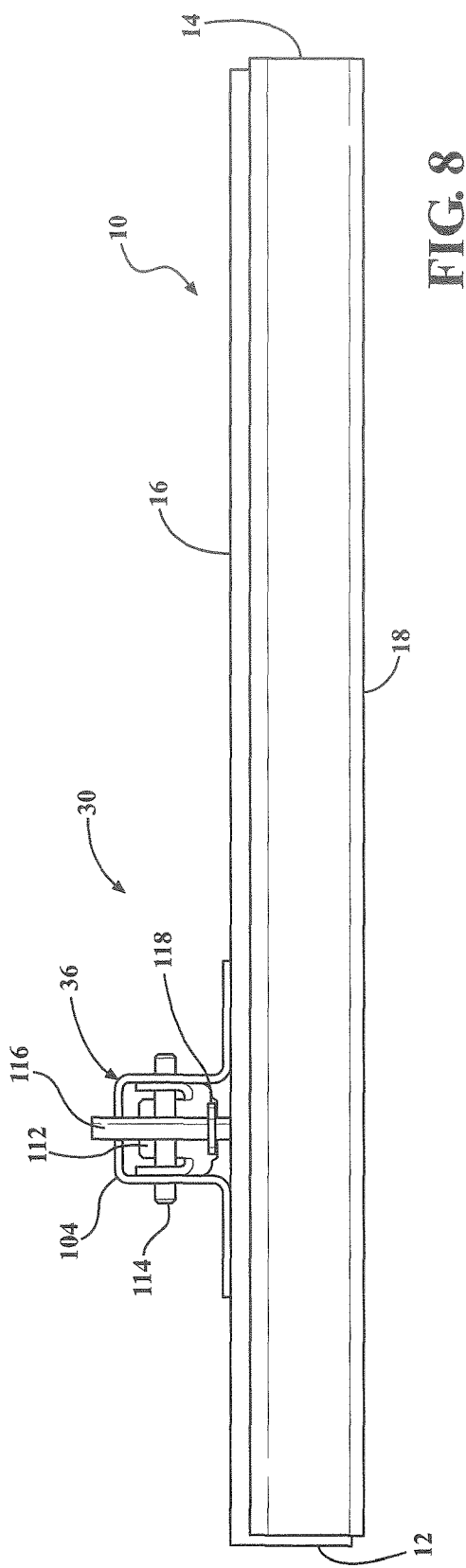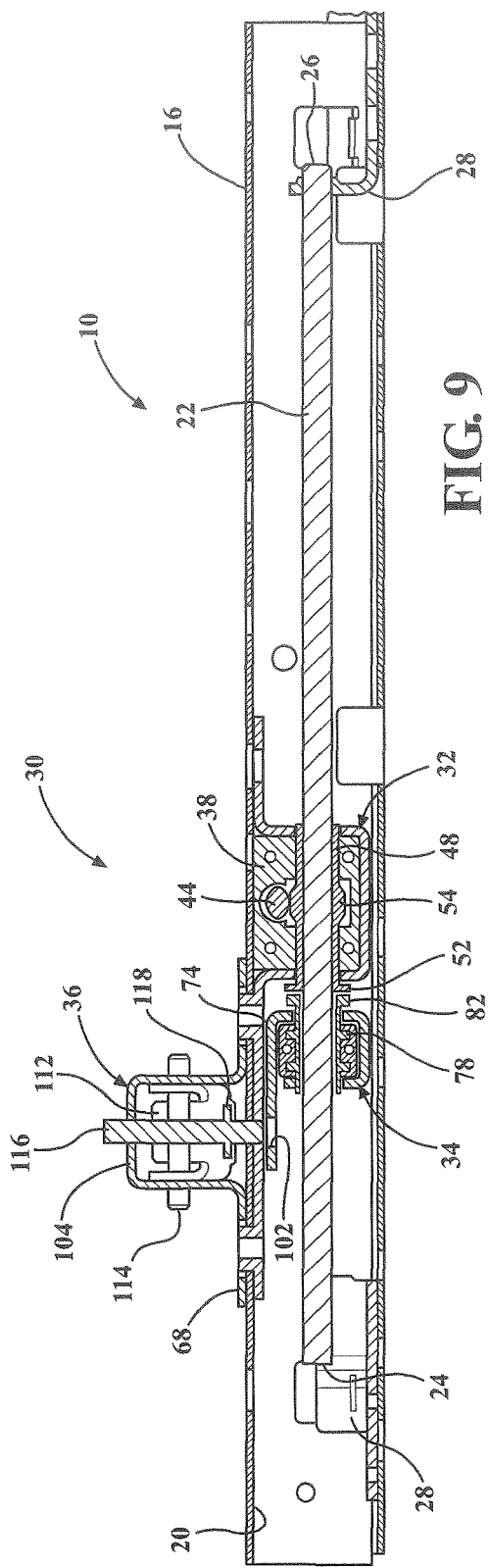

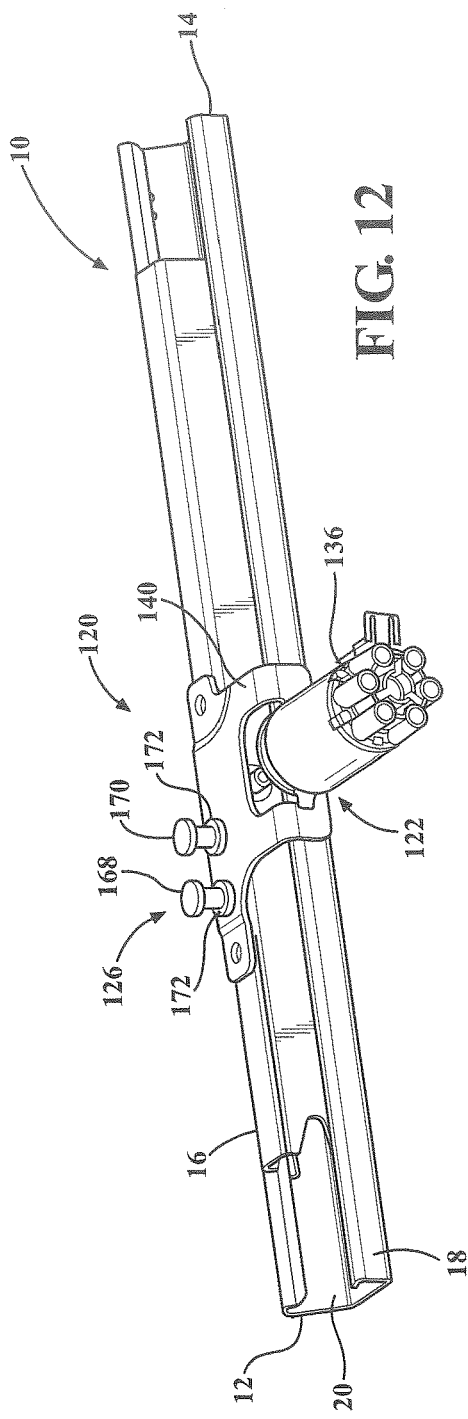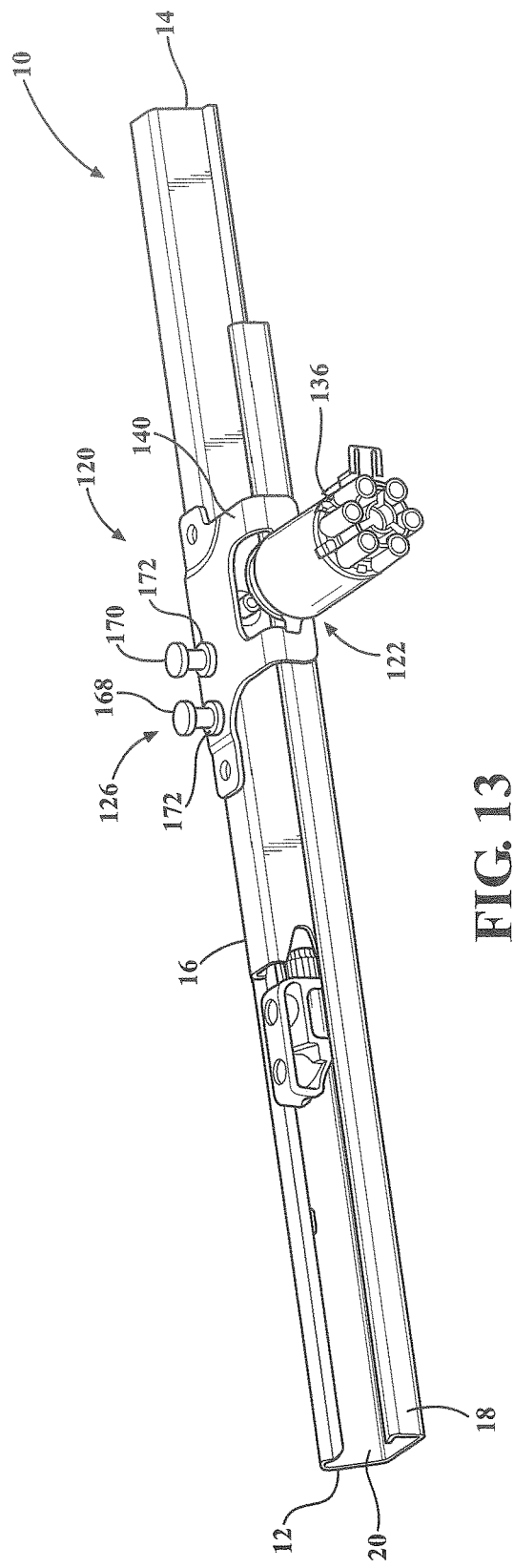

QUICK ADJUST POWER ADJUSTER

CROSS-REFERENCE TO RELATED APPLICATIONS

This application claims priority to and all the benefits of U.S. Provisional Application Nos. 62/052,638 filed on Sep. 19, 2014 and 62/103,719 filed on Jan. 15, 2015.

BACKGROUND OF THE INVENTION

1. Field of the Invention

The invention relates to a quick adjust power adjuster for a seat track for an automotive vehicle seat assembly. More particularly, the invention relates to quick adjust power adjuster having a manual disconnect mechanism for selectively providing both powered and manual fore and aft movement of the seat assembly along a floor of an automotive vehicle.

2. Description of Related Art

Automotive vehicles include seat assemblies for supporting seat occupants within a passenger compartment of the vehicle. Typically, seat assemblies include a generally horizontal seat cushion spaced above a floor of the vehicle and a generally vertical or upright seat back. The seat back is commonly operatively coupled to the seat cushion to allow for selective pivotal adjustment of the seat back relative to the seat cushion between a plurality of reclined seating positions. Many seat assemblies also include a seat track assembly coupled between the seat cushion and the floor to provide fore and aft movement of the seat assembly within the vehicle. Typically, the seat track assembly includes a lower track fixedly secured to the floor of the vehicle and an upper track slidably engaging the lower track. The upper track is fixedly secured to a bottom surface of the seat cushion to allow for sliding movement of the seat assembly along the lower track. It is well known in the vehicle seating art to provide a power seat track assembly driven by an electric motor for moving the upper track, and thus the seat assembly, relative to the lower track. Many such power seat track assemblies include a conventional gearbox or drive assembly operatively coupled in a longitudinal channel between the upper and lower tracks for converting rotational input of the motor into linear movement of the seat assembly. Several such examples are described in U.S. Pat. Nos. 8,226,063; 6,915,998; 6,575,421; 6,322,146; 6,260,922; 5,816,555; 5,314,158; and 4,790,202. Typically, a threaded lead screw is fixedly secured to the lower track and the gearbox is operatively coupled between the lead screw and the upper track. The gearbox or drive assembly includes a housing having through holes or bores that are offset 90 degrees to align and retain a worm and a gear or worm wheel. The gear includes a threaded internal bore for threadably engaging the lead screw and a geared outer surface for meshing with the worm. In an arrangement of this kind the worm is driven by a shaft extending from the motor which in turn causes the gear to rotate. Rotation of the gear causes the gear to move in a longitudinal direction along the fixed lead screw which leads to the desired movement of the upper track relative to the lower track.

However, the motor and drive assembly only provides powered fore and aft movement of the upper track relative to the lower track, and hence, the sliding fore and aft adjustment of the seat assembly. It is often desirable to quickly and manually move the seat assembly from a passenger fore/aft adjusted position to a full forward easy entry position wherein the upper track is moved forward along the lower track to a forward most position therebetween to allow easy access and entry into the vehicle behind the seat assembly. Further, it is also desirable to maintain or remember the passenger fore/aft adjusted position during fore and aft movement of the seat assembly to the full forward easy entry position.

SUMMARY OF THE INVENTION

According to one aspect of the invention, a power adjuster is provided for adjusting the position of a first track relative to a second track of a seat track assembly. The power adjuster includes a lead screw adapted to be fixedly secured to the first track, a drive assembly operatively coupled to the first track and selectively coupled to the lead screw, a driven assembly operatively coupled to the lead screw and selectively coupled to the drive assembly, and a release mechanism coupled to the first track. The release mechanism is operable between a locked condition coupling the driven assembly to the drive assembly and the first track wherein the driven assembly and the drive assembly move longitudinally along the lead screw with the first track relative to the second track and an unlocked condition wherein the driven assembly is decoupled from the first track and retained along the lead screw during movement of the first track relative to the second track.

BRIEF DESCRIPTION OF THE DRAWINGS

Advantages of the present invention will be readily appreciated as the same becomes better understood by reference to the following detailed description when considered in connection with the accompanying drawings wherein:

FIG. 6 is a side view of the seat track assembly and release mechanism of FIG. 1 with the release mechanism is a locked condition;

FIG. 7 is a cross-sectional side view of FIG. 6 with the release mechanism in the locked condition and the quick adjust power adjuster in a power drive operation mode;

FIG. 8 is a side view of the seat track assembly with the release mechanism actuated to an unlocked condition;

FIG. 9 is a cross-sectional side view of FIG. 6 with the release mechanism actuated to the unlocked condition to decouple the driven assembly from the upper track;

FIG. 12 is a perspective view of a seat track assembly and quick adjust power adjuster in a seat adjusted position according to an alternative embodiment of the invention;

FIG. 13 is a perspective view of the seat track assembly and quick adjust power adjuster of FIG. 12 in an easy entry position;

DETAILED DESCRIPTION OF THE EMBODIMENTS

Figure 1:
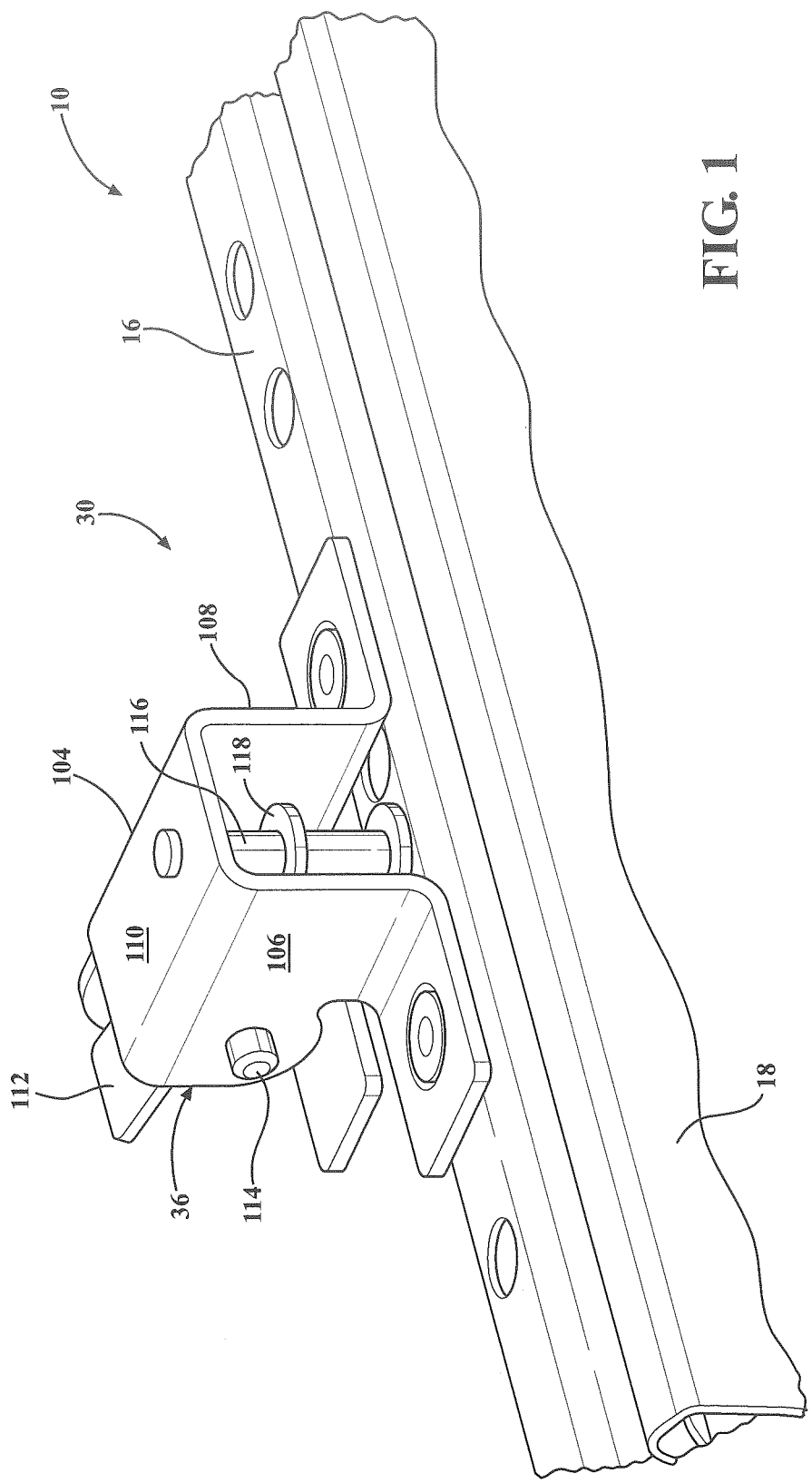
FIG. 1 is a fragmentary perspective view of the seat track assembly and quick adjust power adjuster according to one embodiment of the invention.
Figure 2:
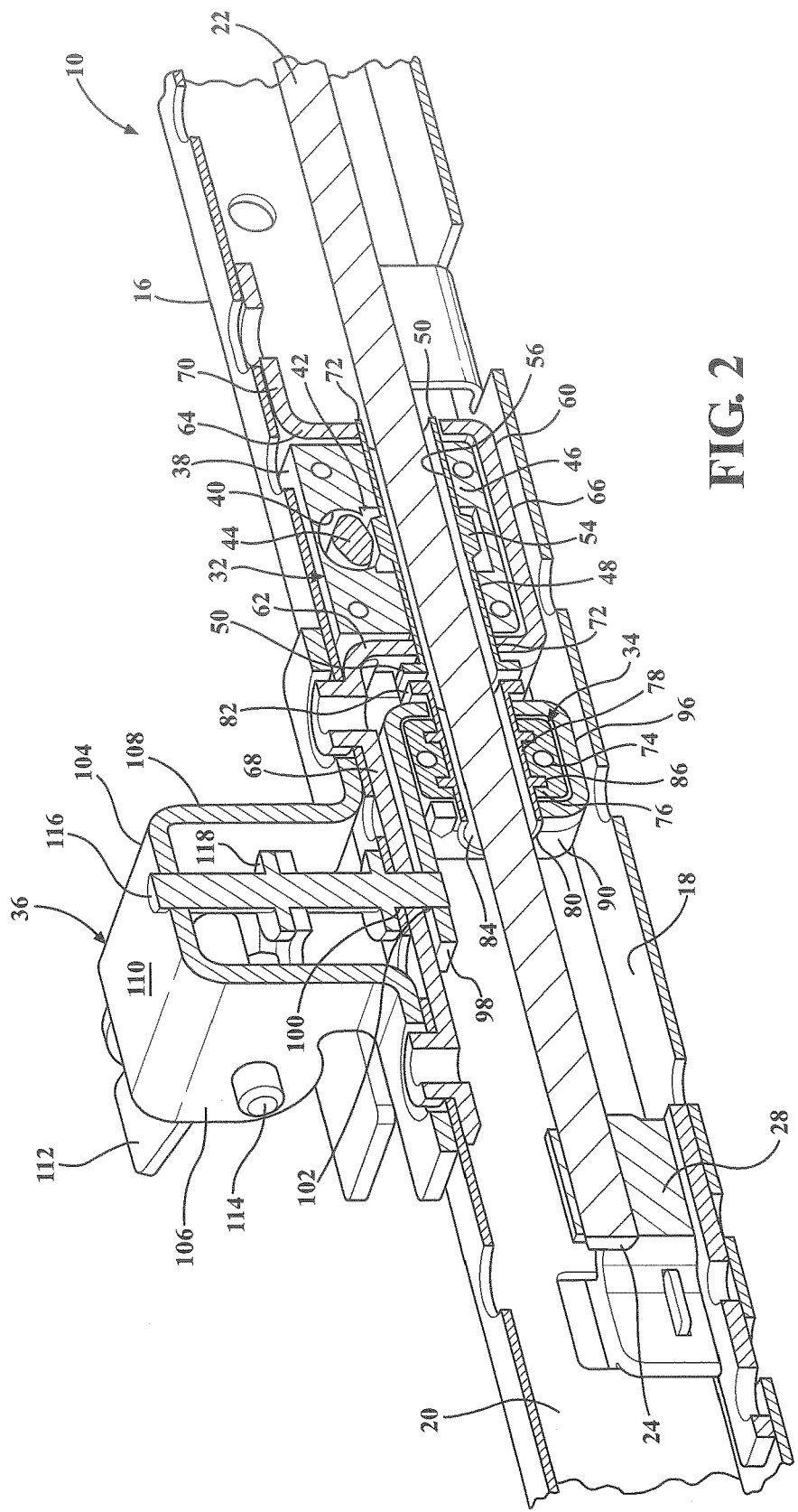
FIG. 2 is a cross-sectional perspective view of the seat track assembly and quick adjust power adjuster of FIG. 1.
Figure 3:
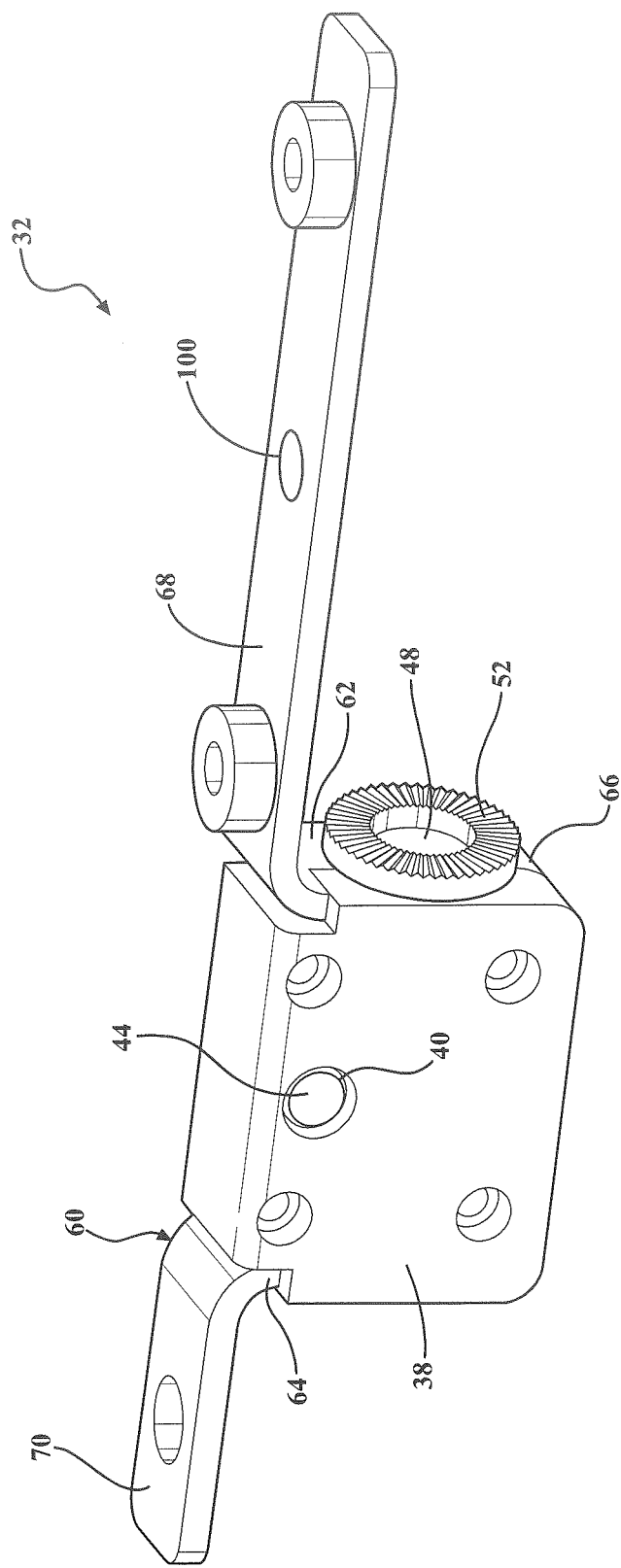
FIG. 3 is a perspective view of a drive assembly of the quick adjust power adjuster.
Figure 4:
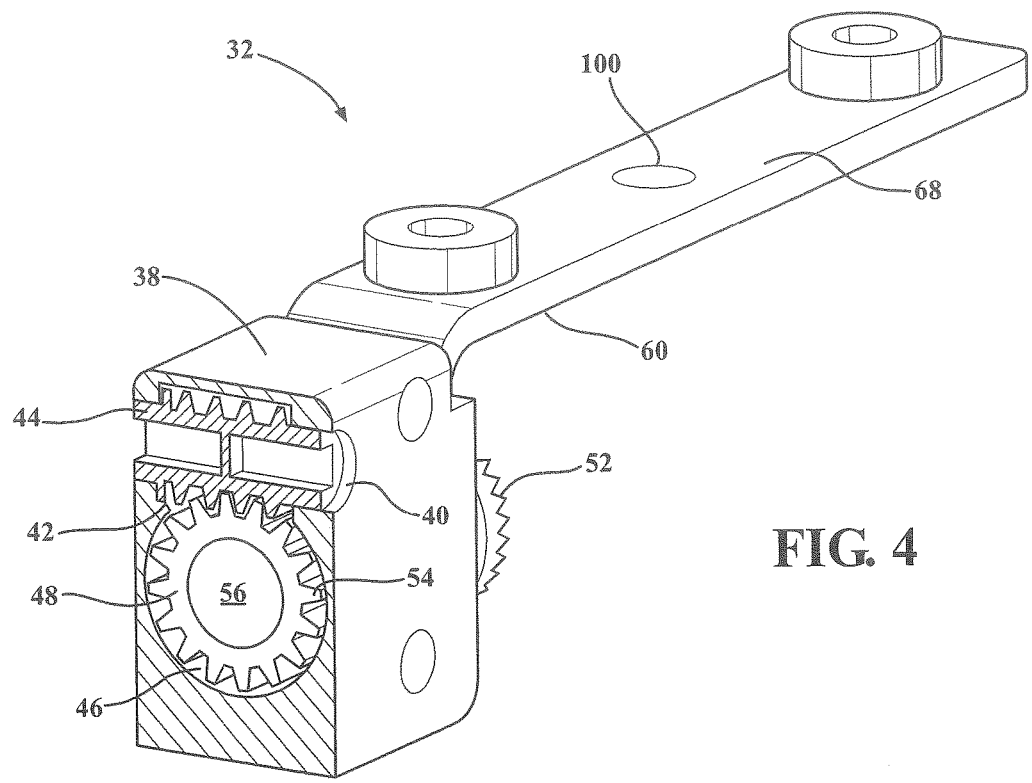
FIG. 4 is a cross-sectional perspective view of the drive assembly of FIG. 3.
Figure 5:
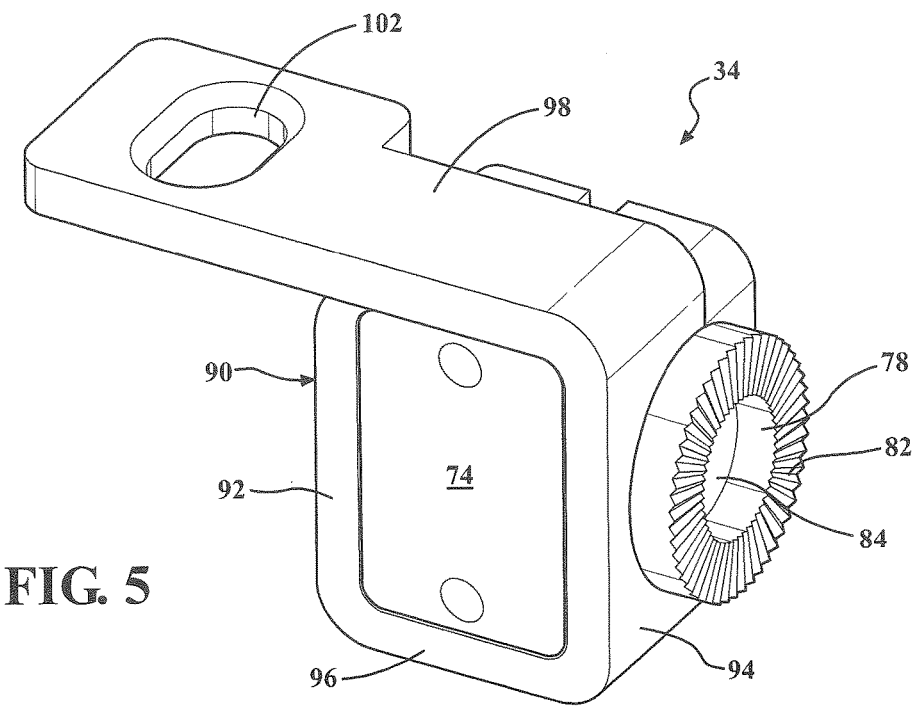
FIG. 5 is a perspective view of a driven assembly of the quick adjust power adjuster.

Referring to the Figures, wherein like numerals indicate like or corresponding parts throughout the several views, a seat track assembly 10 is generally shown in FIGS. 1 and 2 for providing both power and manual sliding fore and aft movement of a seat assembly (not shown) in an automotive vehicle (not shown). The seat track assembly 10 extends longitudinally between opposite fore and aft ends 12, 14 and includes a generally inverted U-shaped upper track 16 slidably and matingly coupled to a generally U-shaped lower track 18 for providing fore and aft sliding movement of the upper track 16 relative to the lower track 18, as is commonly known in the art. The upper track 16 is adapted to be fixedly secured to the bottom side of a seat cushion assembly of the seat assembly and the lower track 18 is adapted to be fixedly secured to the floor of the automotive vehicle. The upper and lower tracks 16, 18 define a longitudinal internal channel 20 therebetween extending between the fore and aft ends 12, 14. Referring to FIG. 7, a threaded lead screw 22 is disposed longitudinally within the channel 20 and extends between a first end 24 and a second end 26. The first and second ends 24, 26 of the lead screw 22 are fixedly secured to the lower track 18 at the respective fore and aft ends thereof by L-shaped brackets 28.

Referring to FIGS. 1-5, a quick adjust power adjuster, hereinafter power adjuster, 30 is operatively coupled between the upper track 16 and lower track 18 for selectively providing both power and manual fore and aft sliding movement of the upper track 16 relative to the lower track 18. The power adjuster 30 includes a drive assembly 32, and driven assembly 34 and a release mechanism 36. The drive assembly 32 is disposed within the channel 20 and is operatively coupled between the lead screw 22 and the upper track 16. The drive assembly 32 drives the upper track 16 longitudinally, or linearly, fore and aft relative to the lower track 18 in response to rotary input by an electric motor (not shown) as is commonly known in the art. The drive assembly 32 includes a housing 38 having a lateral through bore 40 with an open slot 42 for rotatably supporting a worm gear 44 therein. The housing 38 further includes a longitudinal through bore 46 extending therethrough and partially intersecting with the open slot 42 of the lateral through bore 40. A drive face gear 48 is rotatable supported in the bore 46 and extends longitudinally between a first distal end 50 and an opposite end defined by a toothed face gear end 52. The drive face gear 48 includes an external toothed portion 54 in meshed engagement with the worm gear 44 and an smooth internal bore 56 extending between the distal end 50 and toothed face gear end 52 for slidably receiving the lead screw 22 longitudinally therethrough. The drive assembly 32 further includes a generally U-shaped retainer strap 60 for supporting the housing 38 and fixedly securing the drive assembly 32 to the upper track 16. The retainer strap 60 includes longitudinally spaced apart upright portions 62, 64 having lower ends connected by a horizontal bottom portion 66. The upright portion 62 extends into a first horizontal top portion 68 fixedly secured to the upper track 16 and the upright portion 64 extends into a second horizontal top portion 70 facing opposite the first top portion 68 and fixedly secured to the upper track 16. Each of the upright portions 62, 64 further include an axial aligned hole 72 for rotatably and slidably receiving the drive face gear 48 and lead screw 22 therethrough wherein the face gear end 52 is seated laterally outside hole 72 in the upright portion 62.

The driven assembly 34 includes a housing 74 having a longitudinal through bore 76. A driven face gear 78 is rotatably supported by the bore 76 and extends between a distal end 80 and an opposite toothed face gear end 82. The driven face gear 78 includes an inner bore 84 for receiving the lead screw 22 therethough and defining helical threads 86 in meshed engagement with the threaded lead screw 22. The driven assembly 34 further includes a support strap 90 for supporting the housing 74 and for selectively coupling the driven assembly 34 to the upper track 16. The support strap 90 includes a pair of spaced apart upright portions 92, 94 interconnected by a horizontal bottom portion 96. A horizontal top portion 98 extends from the opposite ends of the upright portions 92, 94 and overlaps horizontally and longitudinally with the first top portion 68 of the retainer strap 60. Each of the top portions 68, 98 include holes 100, 102, respectively, extending therethrough for inter-coupling the drive assembly 32 and driven assembly 34 as will be discussed further below.

The release mechanism 36 includes a generally U-shaped support bracket 104 having spaced apart upright legs 106, 108 interconnected by a horizontal top plate 110. The legs 106, 108 are fixedly secured to the top of the upper track 16 and the first top portion 68 of the retainer strap 60. A release lever 112 is pivotally supported by a pivot pin 114 between the spaced apart upright legs 106, 108 for engagement with a vertical locking pin 116. The locking pin 116 is aligned with the hole 100 in the retainer strap 60 and selectively retractable between a locked condition extending through both the hole 100 in the retainer strap 60 and the hole 102 in the support strap 90 for coupling the driven assembly 34 to the drive assembly 32 and a unlocked condition retracted vertically from the hole 102 in the support strap 90 to decouple the driven assembly 34 from the drive assembly 32. The distal end of the release lever 112 engages a lip 118 on the locking pin 116 for actuating the pin 116 between the locked and unlocked conditions.

Referring to FIGS. 6-11, in operation, the seat track assembly 10 is shown in a fore/aft seat adjusted position for seat occupant comfort in FIGS. 6 and 7. The release mechanism 36 of the power adjuster 30 is in the locked condition with the locking pin 116 extending through the vertically aligned holes 100, 102 thereby inter-coupling or connecting the driven assembly 34 and drive assembly 32. With the release mechanism 36 in the locked condition, the driven assembly 34 is also coupled to the upper track 16. The coupling of the driven assembly 34 and drive assembly 32 further includes meshed engagement between the face gear end 82 of driven face gear 78 with opposing face gear end 52 of drive face gear 48 as shown in FIG. 7. In the power operation mode, the electric motor may be actuated to rotate the worm gear 44 of the drive assembly 32 is first or second rotational directions as is commonly known in the art. It should be appreciated that the electric motor may have an output drive shaft connected directly to the worm gear 44 or have a cable or other flexible shaft extending between and interconnecting the output shaft of the electric motor with the worm gear 44. Rotation of the worm gear 44 is a first rotational direction causes rotation of the drive face gear 48. The meshed engagement of the face gear end 52 of the drive face gear 48 with the face gear end 82 of the driven face gear 78 transfers the rotation of the drive face gear 48 to the driven face gear 78. The helical threads 86 of the driven face gear 78 engaged with the threaded lead screw 22 causes the driven face gear 78, and thus the driven assembly 34 to travel longitudinally along the lead screw 22 between the first and second ends 24, 26 thereof in response to rotation of the driven face gear 78 by the drive face gear 48. Since the driven assembly 34 is coupled to the upper track 16 by the release mechanism 36 in the locked condition, the driven assembly 34 forces the upper track 16 to move longitudinally fore and aft along the lower track 18 in the power operation mode for seat occupant adjustment of the seat track assembly 10 and automotive seat within the vehicle.

Figure 10:
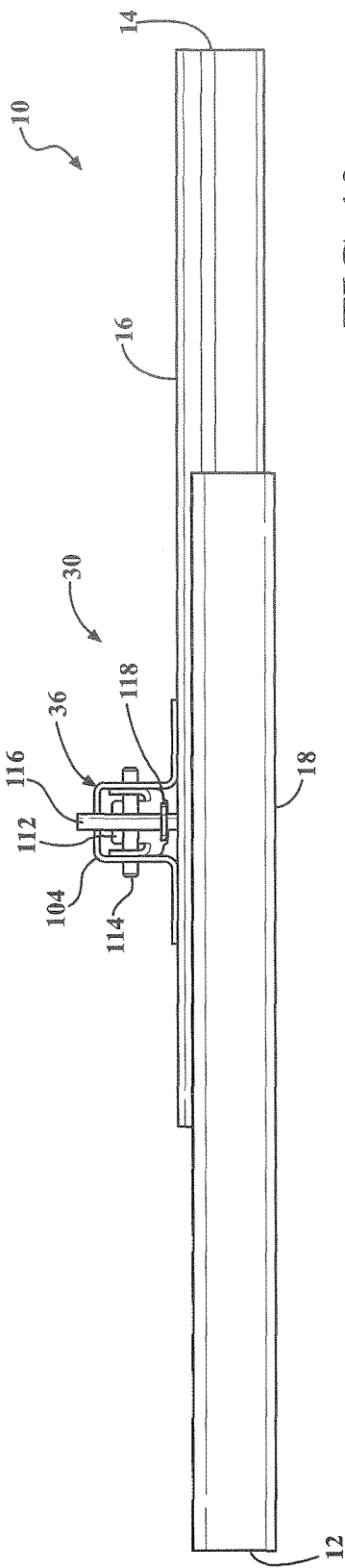
FIG. 10 is a side view of the seat track assembly and release mechanism with the seat track assembly in an easy entry position.
Figure 11:
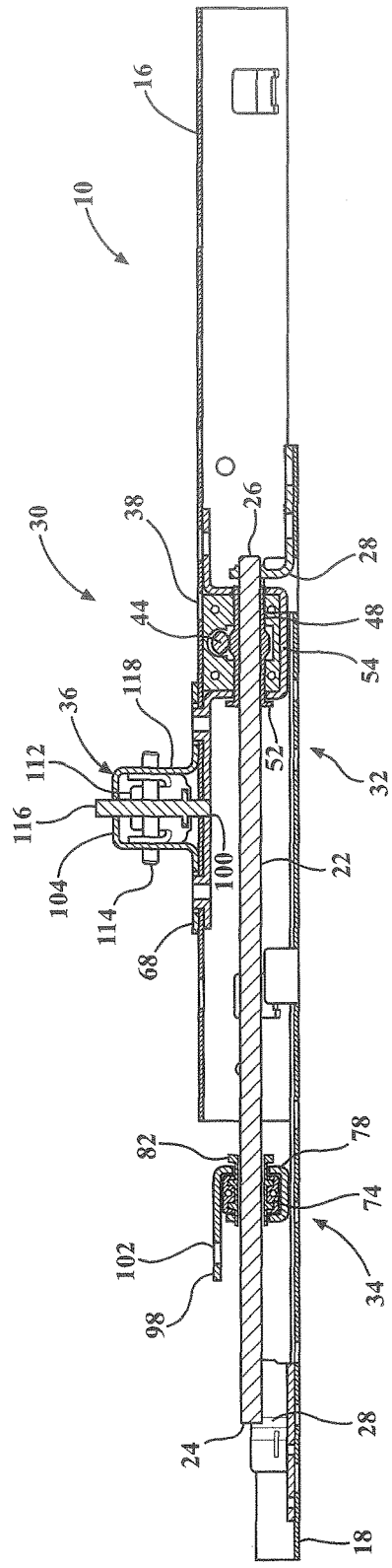
FIG. 11 is a cross-sectional view of FIG. 10 with the quick adjust power adjuster in a manual drive operation mode.
Figure 14:
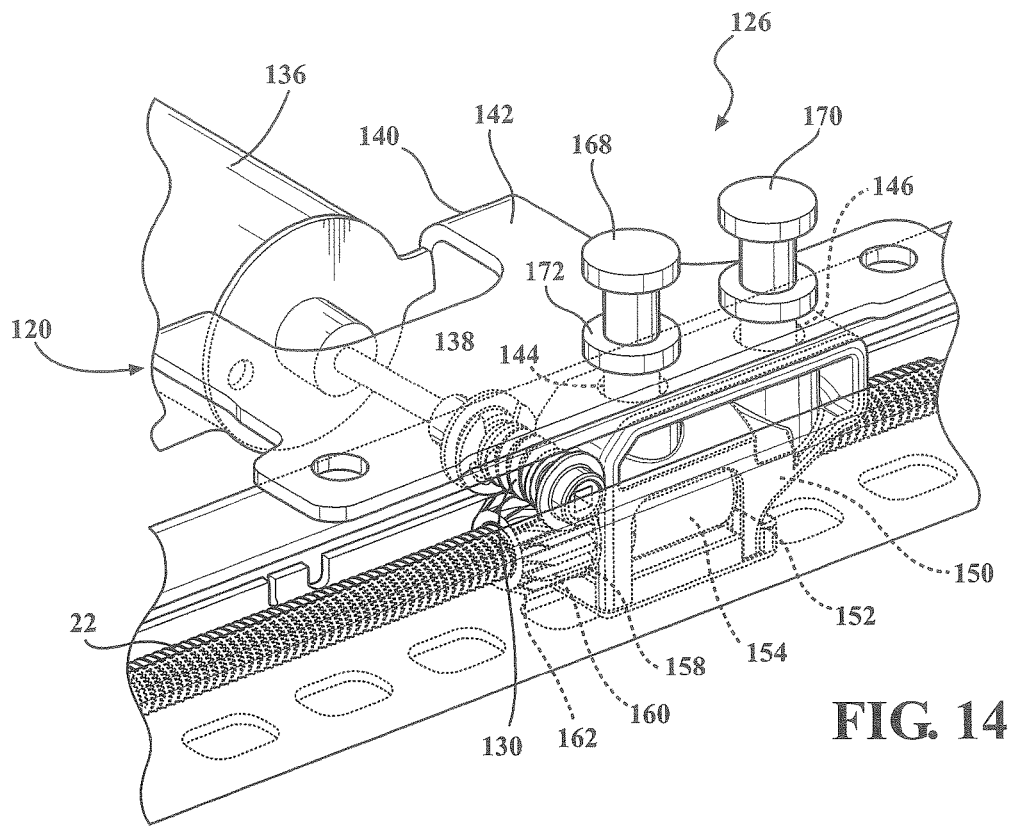
FIG. 14 is fragmentary cross-section view of the quick adjust power adjuster of FIG. 12.

Referring to FIGS. 8 and 9, the release mechanism 36 is shown in the unlocked condition with the locking pin 116 raised vertically by the release lever 112 to remove the locking pin 116 from the hole 102 in the top portion 98 of the support strap 90 thereby decoupling the driven assembly 34 from the upper track 16. In the unlocked condition, the driven assembly 34 is also decoupled from the drive assembly 32 such that the driven face gear 78 is free to separate from the meshed engagement with the drive face gear 48. With the driven assembly 34 decoupled from the upper track 16 and drive assembly 32, referred to as the manual operation mode, the upper track 16 is free to move longitudinally fore and aft along the lower track 18 without actuation of the electric motor or drive assembly 32 from the seat adjusted position to a forward-most position along the lower track 18, defined as an easy entry position as shown in FIGS. 10 and 11, to allow access behind the seat assembly within the vehicle. As shown in FIG. 11, the drive assembly 32 and release mechanism 36 are fixedly secured to the upper track 16 and therefore travel fore and aft with the upper track 16 relative to the lower track 18. The smooth internal bore 56 of the drive face gear 48 allows the lead screw 22 to slide longitudinally through the drive assembly 32 without rotating the worm gear 44 or back-driving the electric motor. Additionally, with the driven assembly 34 decoupled from the upper track 16, the driven assembly 34 maintains its previously adjusted position along the lead screw 22 to maintain a memory position of the previous seat adjusted position of FIGS. 6 and 7.

Finally, the seat track assembly 10 may be manually returned from the easy entry position to the seat adjusted position by manually sliding the upper track 16 longitudinally along the lower track 18 until the drive assembly 32 re-engages the driven assembly 34 and the face gear end 52 of the drive face gear 48 is meshed with the face gear end 82 of the driven face gear 78. Upon return to the seat adjusted position, the release mechanism 36 returns to the locked condition with the locking pin 116 aligned and engaged with both the holes 100, 102 in the straps 98, 68 to couple the driven assembly 34 to the upper track 16 and to the drive assembly 32 for use in the power operation mode as previously described in FIGS. 6 and 7.

Referring to FIGS. 12-17, a quick adjust power adjuster according to an alternative embodiment is generally shown at 120. The power adjuster 120 is similarly operatively coupled between the upper track 16 and lower track 18 for selectively providing both power and manual fore and aft sliding movement of the upper track 16 relative to the lower track 18. The seat track assembly 10 including the upper track 16, lower track 18, channel 20 therebetween, and threaded lead screw 22 disposed longitudinally within the channel 20 and fixedly secured to the lower track 18 are substantially as disclosed in the embodiments of FIGS. 1-11. The power adjuster 120 similarly includes a drive assembly 122, a driven assembly 124 and a release mechanism 126. The drive assembly 122 includes a threaded worm gear 130 seated laterally within the channel 20 between opposite end bushings 132, 134 for rotatable supporting the worm gear 130 within the channel 20 of the upper track 16. An electric motor 136 is operatively coupled to the worm gear 130 by an output shaft 138 for rotating the worm gear 130 is opposite rotational directions in the power operation mode. A support bracket 140 fixedly secures and supports the electric motor 136 on the upper track 16 and includes a top plate 142 having a pair of holes 144, 146 extending through the top plate 142 and upper track 16.

The driven assembly 124 includes a housing 150 having a longitudinal through bore 152. A drive nut 154 is rotatable supported in the bore 152 and extends between a distal end 156 and an opposite driven end defined by a toothed worm wheel 158 projecting from the longitudinal end of the housing 150. The drive nut 154 is threaded onto the lead screw 22 for fore and aft movement along the longitudinal length of the lead screw 22 in response to rotation of the drive nut 154. The distal ends of the teeth 160 of the worm wheel 158 have a leading dual chamfer 162 for facilitating engagement with threads 148 of the worm gear 130 during connecting in the power operation mode as will be further discussed below. The housing 150 further includes a pair of spaced apart bores 164, 166 in the top portion thereof for selective axial alignment with the holes 144, 146 in the support bracket 140.

The release mechanism 126 includes a pair of spaced apart vertical locking pins 168, 170 receiving and supported within the respective pair of holes 144, 146 in the support bracket 140 and upper track 16. Each of the locking pins 168, 170 includes a lip 172 for engagement by a release lever 112 for actuating the pins 168, 170 between locked and unlocked conditions. The release mechanism 126 may further include the support bracket 104 fixedly secured to the upper track 16 as in the embodiment of FIGS. 1-11 for pivotally supporting the release lever 112 for engagement with the locking pins 168, 170. The locking pins 168, 170 are selectively retractable by the release lever 112 between a locked condition extending through both the holes 144, 146 in the support bracket 140 and upper track 16 and the bores 164, 166 in the housing 150 of the driven assembly 124 for coupling the driven assembly 124 to the upper track 16 and an unlocked condition retracted vertically from the bores 164, 166 in the housing 150 to decouple the driven assembly 124 from the upper track 16 and allow separation between the driven assembly 124 and drive assembly 122.

Figure 15:
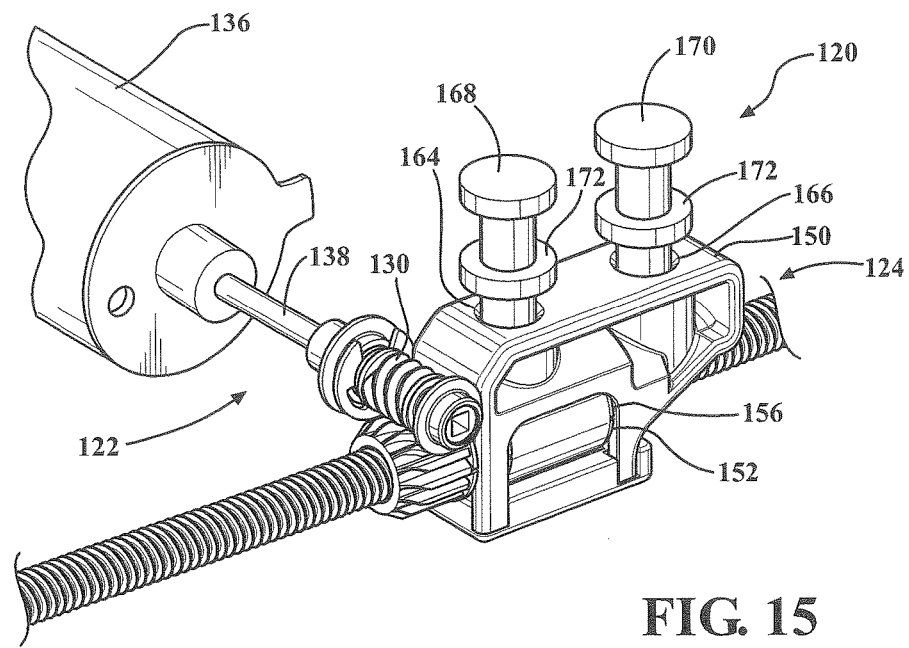
FIG. 15 is a perspective view of the quick adjust power adjuster of FIG. 12 in a power drive mode.
Figure 16:
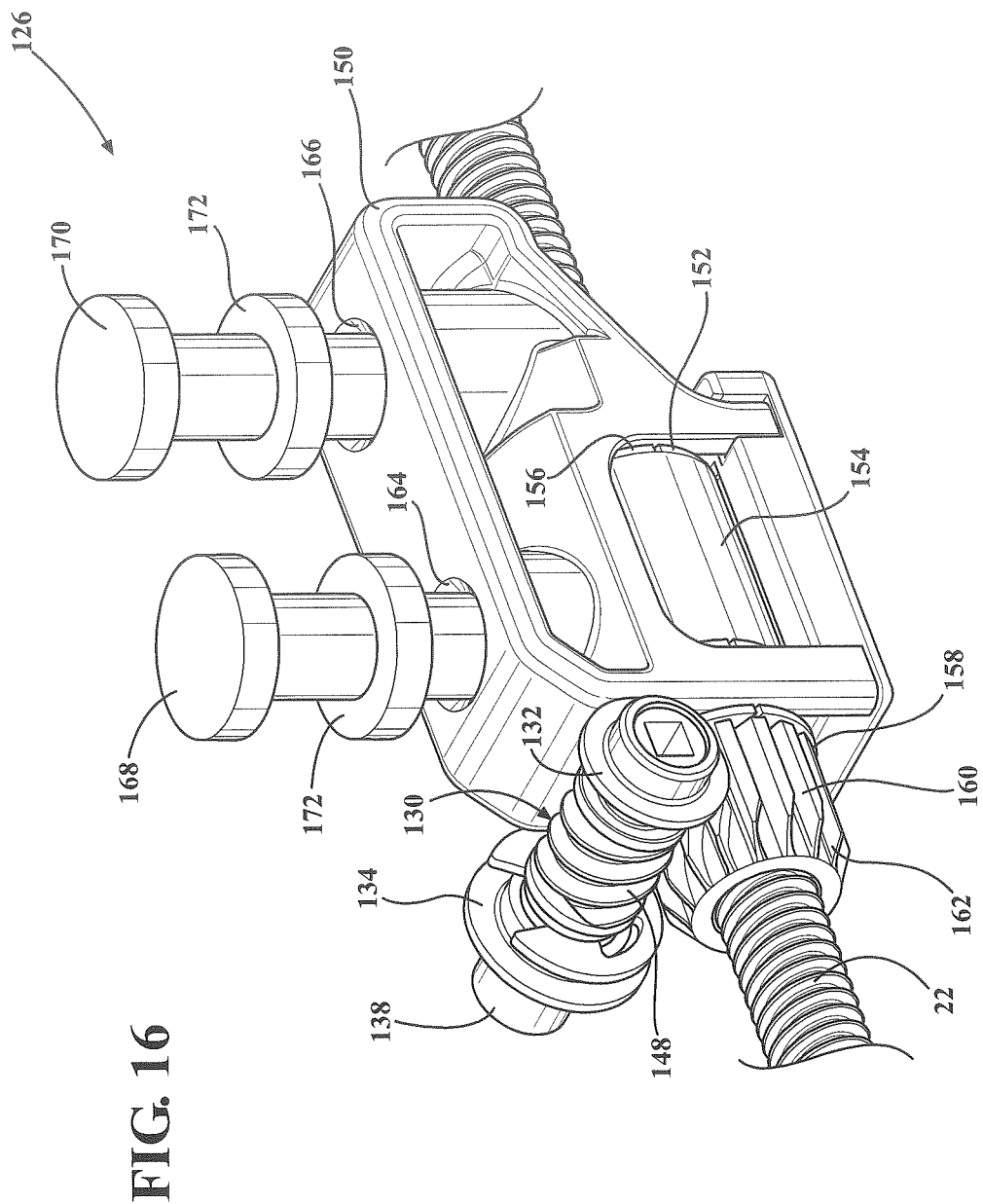
FIG. 16 is a perspective view of the quick adjust power adjuster of FIG. 15.

In operation, the seat track assembly 10 is shown in the fore/aft seat adjusted position for seat occupant comfort in FIG. 12 and in the full forward easy entry position in FIG. 13. In the power operation mode, the release mechanism 126 is in the locked condition with the locking pins 168, 170 extending through the holes 144, 146 in the support bracket 140 and upper track 16 and into the bores 164, 166 in the housing 150 to couple the driven assembly 124 and upper track 16 and inter-connect or couple the drive assembly 122 with the driven assembly 124. The coupling of the drive assembly 122 with the driven assembly 124 includes the meshed engagement of the worm gear 130 with the worm wheel 158 as shown in FIG. 15. In the power operation mode, the electric motor 136 may be actuated to rotate the worm gear 130 of the drive assembly 122 in first or second rotational directions to cause rotation of the worm wheel 158. The drive nut 154 rotates from the rotational force on the worm wheel 158 and causes the driven assembly 124 to travel longitudinally along the lead screw 22 between the first and second ends 24, 26 thereof in response to rotation of the worm gear 130. Since the driven assembly 124 is coupled to the upper track 16 by the release mechanism 126 in the locked condition, the driven assembly 124 forces the upper track 16 to move longitudinally fore and aft along the lower track 18 in the power operation mode for seat occupant adjustment of the seat track assembly 10 and vehicle seat within the vehicle.

Figure 17:
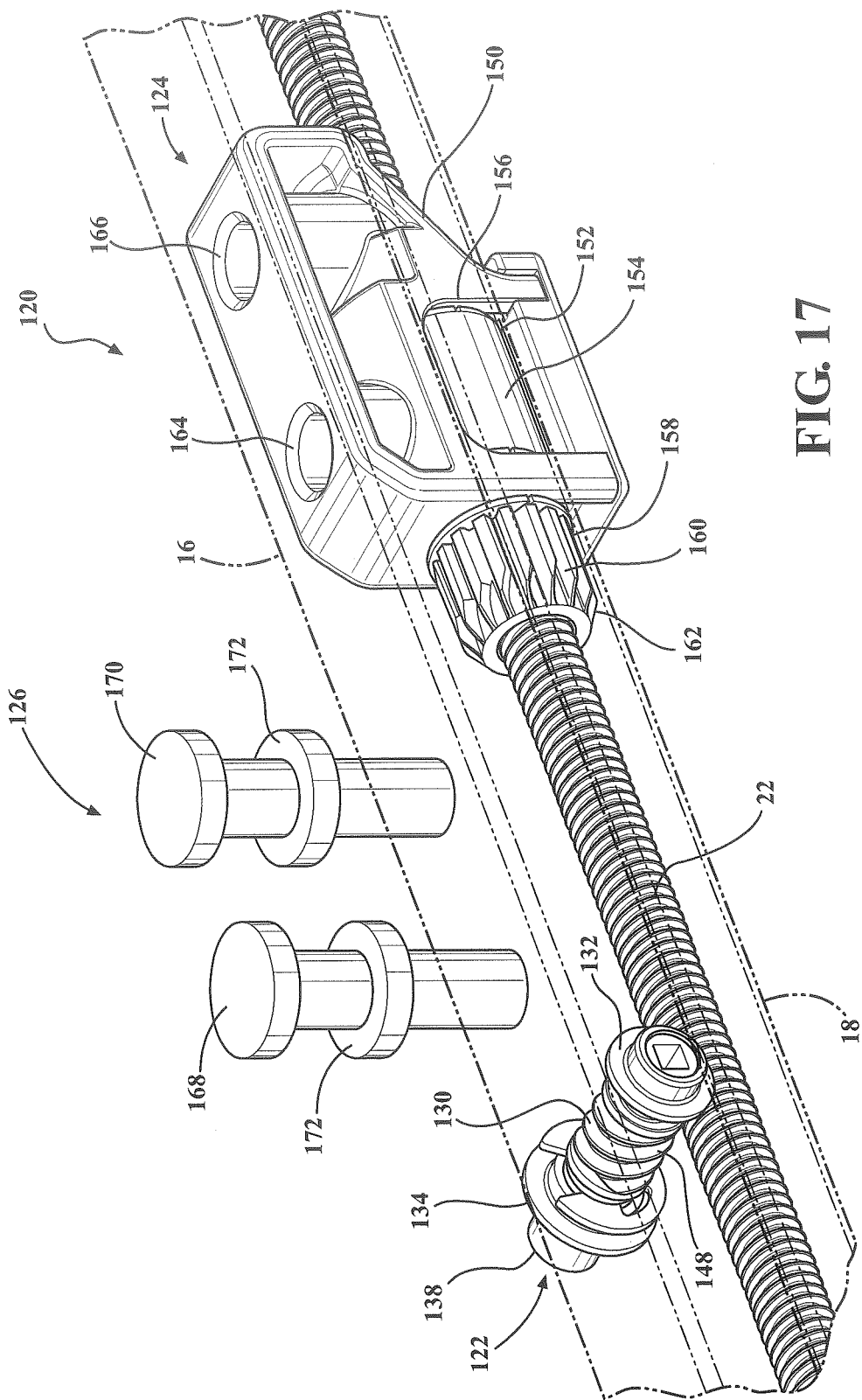
FIG. 17 is a fragmentary perspective view of the seat track assembly and quick adjust power adjuster of FIG. 12 in a manual drive operation mode.

Referring to FIGS. 13 and 17, the release mechanism 126 is in the unlocked position with the locking pins 168, 170 raised vertically and removed from the bores 164, 166 in the housing 150 of the driven assembly 124 thereby decoupling the driven assembly 124 from the upper track 16. In the unlocked condition, the drive assembly 122 is also free to separate or de-coupled from the driven assembly 124. With the driven assembly 124 decoupled from the upper track 16, referred to as the manual operation mode, the upper track 16 is free to move longitudinally fore and aft along the lower track 18 manually without actuation of the electric motor 136 or drive assembly 122 from the seat adjusted position to the easy entry position. The drive assembly 122 and release mechanism 126 are secured to the upper track 16 and therefore travel fore and aft with the upper track 16 relative to the lower track 18. Further, with the driven assembly 124 decoupled from the upper track 16 and drive assembly 122, the driven assembly 124 maintains it previously adjusted position along the lead screw 22 to maintain a memory position of the previous seat adjust position from the power operation mode.

Finally, the seat track assembly 10 may be manually returned from the easy entry position to the seat adjusted position by manually sliding the upper track 16 longitudinally along the lower track 18 until the drive assembly 122 re-engages the drive assembly 124 and the worm gear 130 is meshed with the worm wheel 158. Upon return to the seat adjusted position, the release mechanism 126 returns to the locked condition with the locking pins 168, 170 aligned and engaged with the bores 164, 166 in the housing 150 of the driven assembly 124 to couple the driven assembly 124 to the upper track 16 and the drive assembly 122 for further use in the power operation mode.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A power adjuster for adjusting the position of a first track relative to a second track of a seat track assembly comprising:
    a lead screw adapted to be fixedly secured to said first track;
    a drive assembly operatively coupled to said first track and selectively coupled to said lead screw;
    a driven assembly supported by said second track, said driven assembly operatively coupled to said lead screw and selectively coupled to said drive assembly; and
    a release mechanism coupled to said first track and operable between a locked condition coupling said driven assembly to said drive assembly and said first track wherein said driven assembly and drive assembly move longitudinally along said lead screw with said first track relative to said second track and an unlocked condition wherein said driven assembly is decoupled from said first track and said drive assembly, wherein said driven assembly is in a manual operation mode to allow said first track to move longitudinally fore and aft along said second track with the actuation of said drive assembly and is retained along said lead screw during movement of said first track relative to said second track.

2. The power adjuster as set forth in claim 1 wherein said drive assembly includes a drive gear and said driven assembly includes a driven gear in meshed engagement with said drive gear when said release mechanism is in said locked condition wherein said driven assembly moves longitudinally along said lead screw in response to rotation of said drive gear in a power operation mode.

3. The power adjuster as set forth in claim 2 wherein said release mechanism includes a locking pin actuated by said release mechanism between said locked condition engaged with said driven assembly for coupling said driven assembly with said first track and said drive assembly and said unlocked condition disengaged from said driven assembly for decoupling said driven assembly from said first track and allowing separation of said driven assembly from said drive assembly.

4. The power adjuster as set forth in claim 3 further including a motor operatively coupled to said drive assembly for rotating said drive gear and selectively driving said driven assembly longitudinally along said lead screw in said power operation mode.

5. The power adjuster as set forth in claim 4 wherein said driven assembly includes a housing having a bore therethrough for rotatably supporting said driven gear and wherein said lead screw extends longitudinally through said driven gear and said bore of said housing.

6. The power adjuster as set forth in claim 5 wherein said drive assembly includes housing have a lateral bore therethrough for rotatably supporting a worm gear and a longitudinal bore therethrough intersection said lateral bore for rotatably supporting said drive gear, wherein said worm gear is in meshed engagement with said drive gear.

7. The power adjuster as set forth in claim 6 wherein said drive assembly includes a retainer strap for supporting said housing, said retainer strap including spaced apart upright portions interconnected by a bottom portion and a top portion extending from each upright portion fixedly secured to said first track.

8. The power adjuster as set forth in claim 7 wherein said driven assembly includes a support strap for supporting said housing, said support strap including spaced apart upright portion interconnected by a bottom portion and a top portion overlapping with a top portion of said retainer strap in said power operation mode.

9. The power adjuster as set forth in claim 8 wherein each of said top portions of said retainer strap and said support strap include a through hole axial aligned in said power operation mode for receiving said locking pin therethrough in said locked condition to couple said driven assembly to said drive assembly.

10. The power adjuster as set forth in claim 9 wherein said drive gear includes a toothed face gear end and said driven gear includes an opposing face gear end meshed with said face gear end of said drive gear in said power operation mode to transfer rotation of said drive gear to said driven gear.

* * * * *